United States Patent
Lee et al.

(10) Patent No.: US 8,230,007 B2
(45) Date of Patent: Jul. 24, 2012

(54) METHOD FOR PERMITTING AND BLOCKING USE OF INTERNET BY DETECTING PLURAL TERMINALS ON NETWORK

(75) Inventors: Yun-Seok Lee, Seoul (KR); Jeong-Ah Kim, Seoul (KR); Kyu-Min Choi, Seoul (KR); Se-Eun Cheon, Seoul (KR); Kyoung-Pil Kong, Seoul (KR)

(73) Assignee: Plustech Inc., Seoul (KR)

( * ) Notice: Subject to any disclaimer, the term of this patent is extended or adjusted under 35 U.S.C. 154(b) by 162 days.

(21) Appl. No.: 12/681,748

(22) PCT Filed: Oct. 8, 2008

(86) PCT No.: PCT/KR2008/005905
§ 371 (c)(1),
(2), (4) Date: Apr. 5, 2010

(87) PCT Pub. No.: WO2009/054623
PCT Pub. Date: Apr. 30, 2009

(65) Prior Publication Data
US 2010/0274799 A1    Oct. 28, 2010

(30) Foreign Application Priority Data
Oct. 24, 2007    (KR) .......................... 10-2007-0107414

(51) Int. Cl.
*G06F 15/173*    (2006.01)
(52) U.S. Cl. ........ 709/203; 709/223; 709/226; 713/155; 713/161
(58) Field of Classification Search .................. 709/203, 709/223–226; 713/155, 161
See application file for complete search history.

(56) References Cited

U.S. PATENT DOCUMENTS

| | | | | |
|---|---|---|---|---|
| 5,970,477 | A | * | 10/1999 | Roden .............................. 705/32 |
| 2002/0046105 | A1 | * | 4/2002 | Gardenswartz et al. ......... 705/14 |
| 2002/0066029 | A1 | * | 5/2002 | Yi .................................. 713/201 |
| 2003/0229782 | A1 | * | 12/2003 | Bible et al. ..................... 713/155 |
| 2004/0019518 | A1 | * | 1/2004 | Abraham et al. ............... 705/10 |
| 2005/0102358 | A1 | * | 5/2005 | Gold et al. ..................... 709/204 |
| 2006/0062228 | A1 | * | 3/2006 | Ota et al. ....................... 370/401 |
| 2007/0038516 | A1 | * | 2/2007 | Apple et al. .................... 705/14 |
| 2007/0061869 | A1 | * | 3/2007 | DeHaas ........................... 726/2 |
| 2008/0144655 | A1 | * | 6/2008 | Beam et al. .................... 370/466 |
| 2009/0013089 | A1 | * | 1/2009 | Sullivan et al. ................ 709/238 |

FOREIGN PATENT DOCUMENTS

| | | |
|---|---|---|
| KR | 10-2002-0093398 A | 12/2002 |
| KR | 10-2003-0091206 A | 12/2003 |
| WO | WO 99/64967 A1 | 12/1999 |
| WO | WO 2006/071065 A1 | 7/2006 |

\* cited by examiner

Primary Examiner — Hanh Thai
(74) Attorney, Agent, or Firm — Birch, Stewart, Kolasch & Birch, LLP

(57) ABSTRACT

The present invention is related to a technology for grasping the number of a plurality of terminals of a client using a Cookie in a private network in which plural terminals are shared by redirecting a session which is to be connected to a Web by analyzing a TCP/IP packet, detecting the accurate number of a plurality of terminals of a client using an Internet, and making the accurate number as a DB, and selectively permitting or blocking a connection to Internet according to TCP/IP by using the Cookie pool information of a DB type and JOB when the users configuring and using a private network connect to the Internet at the same time.

6 Claims, 4 Drawing Sheets

[Fig. 1]
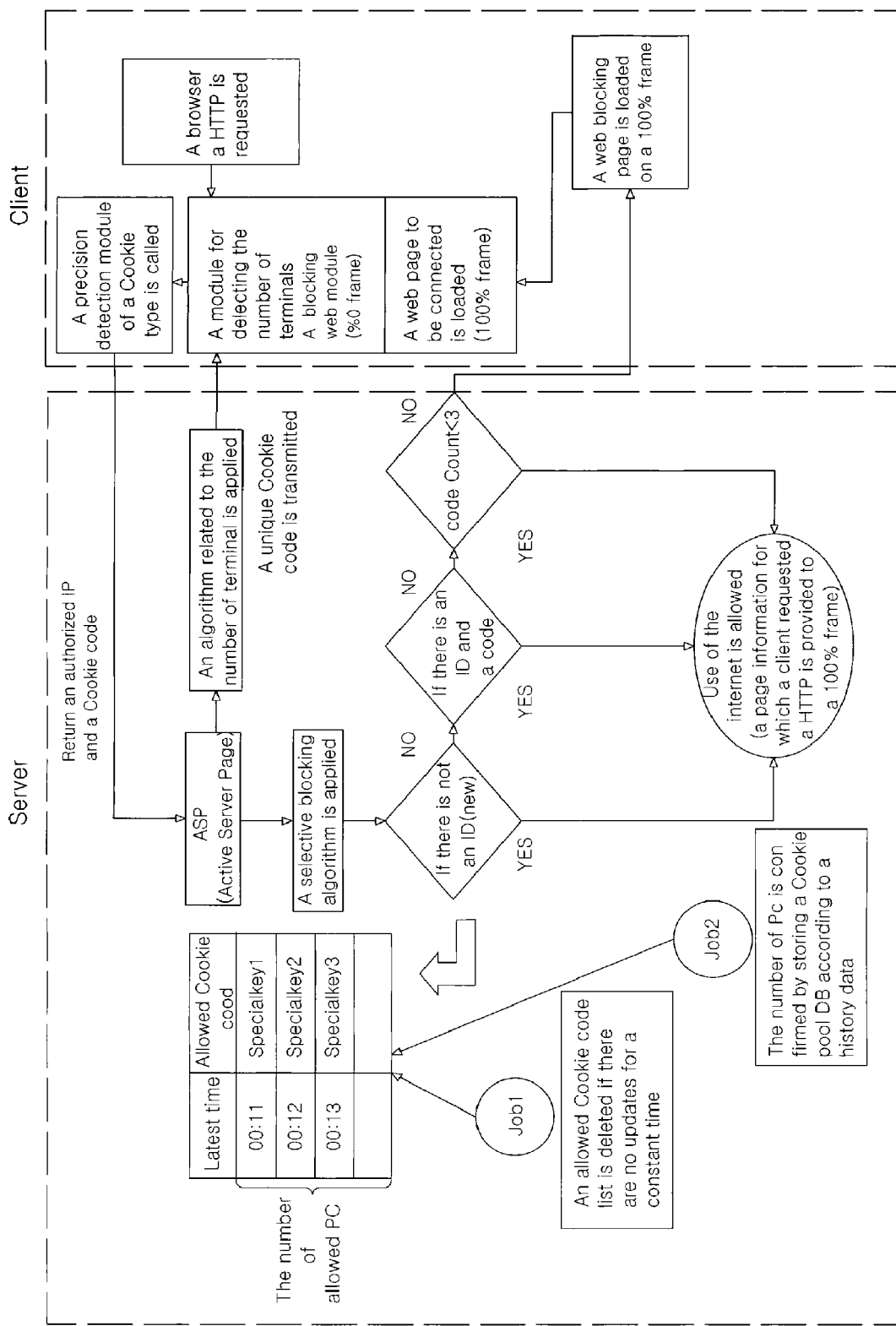

[Fig. 2]

```
An identification code generated by a detection
server of a client PC is requested, and if there are
identification codes, the value of "0" is set.

If ( the identification code is 3 ) then
(
         Specialkey is embeded in a concerned terminal, and thus
use of Internet is allowed without going to a next process.

If( there exists an ID, and an identification code is 2) then
)
Else
      (   An identification cde is changed to 3.
          It is stored in a Cookie pool DB and a concerned terminal after
          generating a specialkey.
          Use of Internet is allowed for a next process.
      )
    Else
    (
      Since a requsted identification code is 0,"1" is added.
      Since the concerned terminal uses the Internet for the first time,
use of
      Internet is allowed for a next process.
    )
)
```

[Fig. 3]

| ID | authorized IP | cookie code | connection time |
|---|---|---|---|
| Test | 222.222.222.111 | Specialkey1 | 2:10 |
| Test | 222.222.222.111 | Specialkey2 | 2:12 |
| Test | 222.222.222.111 | Specialkey3 | 2:16 |
| Test1 | 220.220.220.2 | Specialkey5 | 2:14 |
| Test1 | 220.220.220.2 | Specialkey10 | 2:13 |

[Fig. 4]

```
If ( there is not an ID (new) ) then
(
        Use of internet is allowed after adding a record to a Cookie
pool DB
)
        If ( there are an ID and a Cookie code ) then
        (
        Use of Internet is allowed after correcting a record in a
Cookie pool DB
            )
          Else
          (
                If(Cookie code Count) < an allowed policy number
PMT
                Use of Internet is allowed after adding a record to
a Cookie pool DB
            )
            Else
            (
                Use of Internet is blocked for a concerned
Cookie code.
            )
          )
)
```

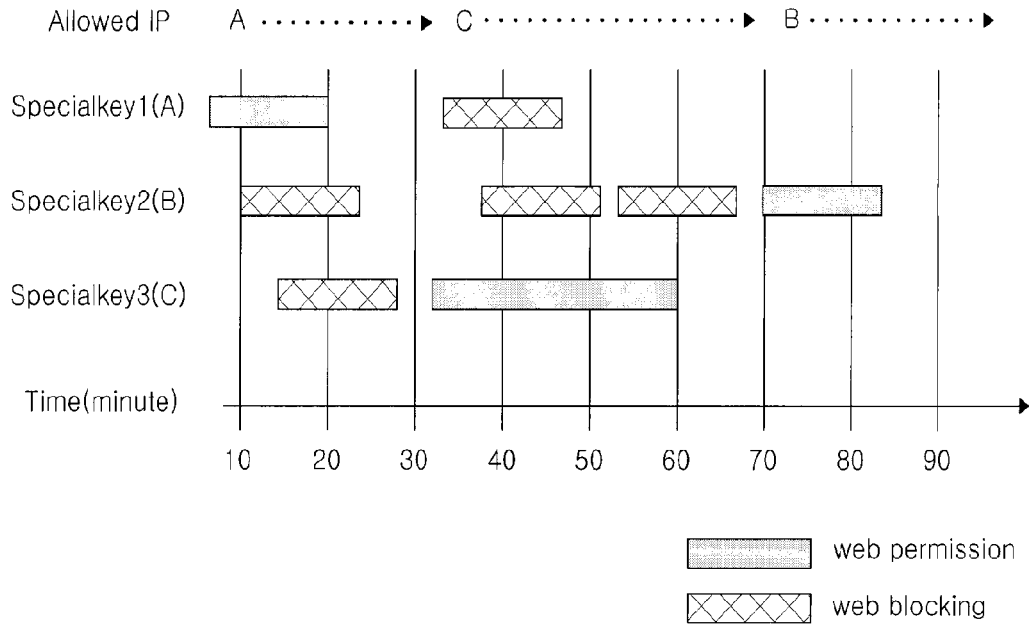

[Fig. 5]

[Fig. 6]
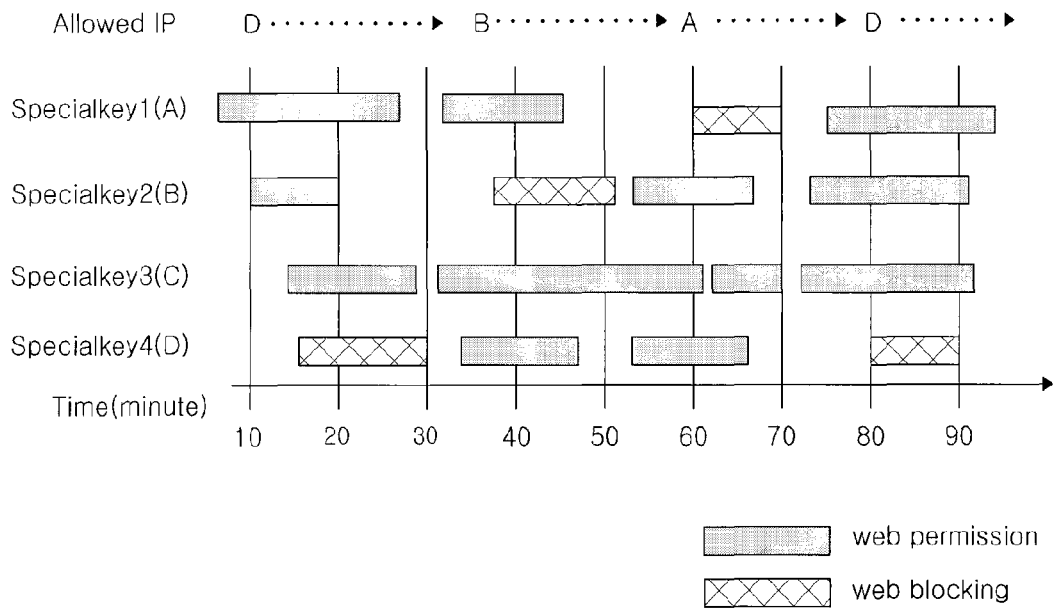
[Fig. 7]
| ID | Authorized IP | Cookie code | Connection time | |
|---|---|---|---|---|
| Test | 220.220.220.1 | Specialkey1 | 2:10 | (0) |
| Test | 220.220.220.1 | Specialkey2 | 2:12 | (0) |
| Test | 220.220.220.1 | Specialkey3 | 2:16 | (0) |
| Test1 | 220.220.220.2 | Specialkey5 | 2:14 | (0) |
| Test1 | 220.220.220.2 | Specialkey10 | 2:13 | (0) |
| Test | 220.220.220.1 | Specialkey4 | 2:19 | (X) |
[Fig. 8]
| ID | A policy number of an allowed code |
|---|---|
| Test | 3 |
| Test1 | 2 |
| Test2 | 1 |
| Test3 | 1 |

METHOD FOR PERMITTING AND BLOCKING USE OF INTERNET BY DETECTING PLURAL TERMINALS ON NETWORK

TECHNICAL FIELD

The present invention is related to a technology for grasping the number of a plurality of terminals of a client using a Cookie in a private network in which plural terminals are shared; detecting the accurate number of a plurality of terminals of a client using an Internet, and making the accurate number as a DB; and selectively permitting or blocking a connection to Internet according to TCP/IP when the terminals exceeding an allowed policy number of terminals connect to the Internet at the same time. In particular, the present invention is related to a method comprising a step for analyzing a TCP/IP packet; a step for detecting an user using a sharing device by executing a web redirection so that a connection can be made to a server for confirming whether an Internet user is using the sharing device or not, and a shared client information; a step for storing the actual number of terminals of a client in a pool by using an unique Cookie code while an Internet service subscriber to one line service is using a sharing device; a step for counting the actual number of PC terminals which are used in a sharing manner; and a step for blocking additional PC terminals exceeding a designated number of terminals by applying a rule of an allowed number of terminals.

BACKGROUND ART

Recently, a case is generated very frequently that a subscriber uses a sharing device so that many clients can connect to a network using one authorized IP at the same time. A phenomenon that the companies or the big enterprises are using NAT is on an increasing trend.

DISCLOSURE OF INVENTION

Technical Problem

But, when many clients connect to a network using one authorized IP at the same time, very serious problems such as a traffic increase of a network, hacking, virus and worms may be generated.

In order to solve this problem, a separate application(ActiveX, Agent) which informs an IP address of an user in an inner network must be loaded, but this application has a problem that an user can reject it after he recognizes installation/operation of the application.

Technical Solution

In order to solve such a conventional technological problem, the present invention provides a step for analyzing a TCP/IP packet and redirecting the TCP/IP packet to a specific server which manages a Cookie according to a policy;

a step for recognizing installation/operations of a plurality of terminals of a client by using a Cookie in a private network sharing many terminals to be detected, or counting the number of a plurality of terminals of a client without any permission/authentication;

a step for detecting an accurate number of terminals in a private network sharing many terminals by a precise algorithm using a Cookie;

a step for deleting a corresponding list from a Cookie pool DB if there are no history of an Internet use for a constant time;

a step for applying a particular blocking page on an user web browser according to a policy for a specific user;

and a step for enabling the number of terminals allowed by an Internet service business man to be connected to an Internet by an algorithm that compares PMT and a corresponding Cookie pool information when a plurality of terminal users connect to a network at the same time in a private network, and for allowing and blocking an Internet use by the number of policies of PMT(Policy Management Table); and a step for allowing and blocking clients who can use an Internet at the same time.

Advantageous Effects

According to the present invention, since an unique Cookie code for client terminals in a private network that many terminals share using an authorized IP(an Internet IP) is generated and is detected precisely by analyzing a TCP/IP packet and redirecting an Internet connection of a client to a server, the number of terminals of a client using an Internet at the same time is recorded for DB so that the number can be counted precisely, and thus detection of the number of terminals can be analyzed accurately. When private network users of a specific authorized IP connect to an Internet at the same time, it is possible to allow and to block an Internet connection in a private network based on TCP/IP using information of the Cookie pool DB which is recorded as a DB type, and JOB.

Further, according to the present invention, it is possible grasp whether a plurality of terminals of a client who can use an Internet are being used in a private network using an authorized IP by an algorithm or not, and the accurate number of terminals.

Further, it is also possible to easily allow and block a connection to an Internet based on a plurality of unauthorized TCP/IPs by allowing or blocking clients who can connect to an Internet at the same time in a private network using an authorized IP.

BRIEF DESCRIPTION OF DRAWINGS

FIG. 1 is a diagram showing all processes for controlling sharing clients of a sharing device.

FIG. 2 is a diagram showing a process for installing an unique key into a terminal in a private network.

FIG. 3 is a diagram showing a process for counting the number of terminals using a Cookie pool history DB.

FIG. 4 is a diagram showing a source for comparing information of a Cookie pool DB and PMT(Policy Management Table).

FIG. 5 is a diagram showing a case allowing use of the Internet via only one line.

FIG. 6 is a diagram showing a case allowing use of the Internet via only three lines.

FIG. 7 is a diagram showing a Cookie pool DB in case of allowing use of the Internet via only three lines.

FIG. 8 is a diagram showing a PMT.

BEST MODE FOR CARRYING OUT THE INVENTION

A method for permitting and blocking use of Internet by detecting plural terminals on network using more than one authorized IP comprises, a step for analyzing a TCP/IP packet and redirecting a web connection of a client to a server according to a policy of a specific user in order to confirm the number of plural terminals of a subscriber constituting a private network by redirecting the web connection of the client to the server when monitoring traffic when the client uses the Internet, and to block or permit terminals exceeding a designated number of sharing terminals;

a step for providing to the client a web page having specific functions to perform a selective blocking, and to execute a precision detection algorithm for detecting the number of terminals and notifying to the redirected client;

a step for allocating an unique Cookie code value to the client in a real time manner via the server at the step for providing to the client a web page having specific functions;

a step for registering the unique Cookie code value generated in the client together with an authorized IP of the client or an identifier corresponding to the IP on the Cookie pool DB of the server; and a step for confirming the number of terminals connected to the authorized IP or the identifier corresponding to the IP by counting the number of the unique Cookie code according to the authorized IP stored in the Cookie pool DB.

Mode for the Invention

Below, the structure and the operation of the present invention will be explained with referring to the attached drawings.

FIG. 1 is a diagram showing all processes for controlling sharing clients of a sharing device. As illustrated in FIG. 1, according to the present invention, when a plurality of terminals in a private network connect to Internet and use it at the same time, HTML page is requested from a client to an arbitrary web server on Internet in order to detect the number of terminals which are actually being used, and execute permission and blocking of an Internet connection according to TCP/IP.

In connection with a private network user sharing many terminals, first of all, a page into which a specific role(a precision detection algorithm and blocking) is inserted is transmitted to a client after a packet analysis is executed instead of the page requested by a client by monitoring traffic of all sessions connecting to an arbitrary web server, and then it is redirected to a server.

At this time, the server manages a Cookie value, and controls a redirected web connection.

A redirection page forms a page showing a web page which is to be connected as a frame structure of two stage as 100% type(below, it is described as a 100% frame.), and forms the remaining pages as o % type((below, it is described as a 0% frame.).

If the size of a frame is a 0% frame, the frame is a frame for executing a module, and if the size of a frame is a 100% frame, the frame is a frame for providing information of the page HTTP of which is requested by a client, a Cookie precision detection algorithm, and a blocking page.

In case of a 0% frame, an unique Cookie value of an Internet user who is now using Internet is obtained by a Cookie precision detection algorithm, and the number of a plurality of terminals corresponding to the number of the values can be counted.

If necessary, after executing a function which the 0% frame performs in the whole pages of a client without employing a frame structure, a function executed by the 100% frame may be performed sequentially.

In the request page, a Cookie is generated and executed by a Cookie precision detection algorithm, and an unique Cookie value is stored in a terminal and then, the information thereof is stored in a Cookie pool DB.

FIG. 2 is a diagram showing a process for installing an unique key into a terminal in a private network.

As a result of reviewing a Cookie precision detection algorithm, the step for detecting the number of a plurality of terminals arranged under an equipment sharing many terminals consists of three stages. First, a request is made for confirming whether a Cookie value generated by a server of a detection server exists or not in order to grasp whether an user using a specific authorized IP(for example, 222.222.222.111) connects to the Internet for the first time after monitoring and analyzing traffic based on TCP/IP, and redirecting it to server. At this time, if the Cookie value exists, it is judged that a terminal of the user is a PC the number of terminals of which has been checked by an algorithm. Then, a process goes to a next step so that the user can connect to Internet. If there are no Cookie values, since the terminal is the first PC which is connected to Internet for the first time, a designated identification code(A or 1) indicating the first connection is generated by the algorithm and is allocated to a client.

Second, if an user using a specific authorized IP(for example, 222.222.222.111) connects to the Internet after monitoring and analyzing traffic based on TCP/IP, and redirecting it to server, two cases may be generated. First of all, a request is made for confirming whether a Cookie value generated by the detection server exists or not, as the first method. [1] If a terminal connects to Internet for the first time without having any identification code as the first method, a designated identification code(A or 1) indicating the first connection is generated by the algorithm and is allocated to a client. [2] If an identification code exists, a designated identification code(B or 2) indicating the second connection is generated by the algorithm and is allocated to a client. Then, a process goes to a next step so that the user can connect to Internet.

Third, if an user using a specific authorized IP(for example, 222.222.222.111) connects to the Internet after monitoring and analyzing traffic based on TCP/IP, and redirecting it to server, three cases may be generated. First of all, a request is made for confirming whether a Cookie value generated by the detection server exists or not, as the first method. [1] If a terminal connects to Internet for the first time without having any identification code as the first method, a designated identification code(A or 1) indicating the first connection is generated by the algorithm and is allocated to a client. Then, a process goes to a next step so that the user can connect to Internet. [2] If a designated identification code is A or 1, and etc, after changing the code(A or 1) and creating a new identification code(B or 2), the new code is allocated to the related terminal. Then, a process goes to a next step so that the user can connect to Internet. [3] If a designated identification code is B or 2, and etc, after changing the code(B or 2) and creating a new identification code(End or 3) indicating ending of a process, the new code is allocated to the related terminal. Then, if the designated identification code is End or 3 indicating ending of a process, an unique Cookie is stored to a concerned terminal at the changing time, and then a process goes to a next step so that the user can connect to Internet. Then, the information is stored in the Cookie pool DB.

FIG. 3 is a diagram showing a process for counting the number of terminals using a Cookie pool history DB.

In this way, in connection with a plurality of specific authorized IP, after monitoring and analyzing traffic and then, redirecting it to server, if a Cookie precision detection algorithm is applied continuously, an unique Cookie information created for one authorized IP can be confirmed from a Cookie pool DB. Since the unique Cookie code in a Cookie pool DB is stored as a Cookie pool history DB, if the unique Cookie code for one authorized IP is counted, it is possible to know the accurate number of terminals for a concerned authorized IP.

Next, a blocking process will be explained.

FIG. 4 is a diagram showing a source for comparing information of a Cookie pool DB and PMT(Policy Management Table). As for a specific identifier which can be distinguished in an unique manner, assuming that a policy that an allowed number of terminals for PMT is 3 is set, first of all, it is judged whether the user who is now connecting to the Internet is an user who connects to Internet for the first time or not.

If an identifier does not exist in a Cookie pool DB, it is a newly created identifier.

Therefore, an user records the identifier, an authorized IP, an unique Cookie code, and a connection time in the Cookie pool DB, and then, the user can use the Internet normally. Further, if an authorized IP same as the identifier exists in the Cookie pool DB, the user can use the Internet normally by updating a connection time corresponding to an unique Cookie code same as the identifier.

On the contrary, if an authorized IP same as the identifier exists in the Cookie pool DB, but an unique Cookie code does not exist, two cases must be considered.

First, after counting the number the unique Cookie codes of same identifiers in the Cookie pool DB, if the result is below the policy number of PMT, the identifiers, an user should record the unique Cookie codes, and the connection times in the Cookie pool DB, and then can use the Internet normally.

Second, if the number the unique Cookie codes of same identifiers in the Cookie pool DB is above the policy number of PMT, the identifiers, use of the Internet is blocked.

The Internet blocking is processes as follows. When a result value of a module executed in the 0% frame is returned, a 100% frame is controlled according to the result value.

At this time, if it is judged that the result value indicates permission of an Internet use, a HTTP page requested by a client is provided, and if it is judged that the result value indicates blocking of an Internet use, a blocked page is displayed on the 100% frame.

Further, an user registers and manages a JOB scheduler which operates regularly at every predetermined interval so that information in the Cookie pool DB can be updated continuously. At this time, in connection with the criteria which the JOB scheduler judges and maintains the contents in the Cookie pool DB as up-to-date information, the records for which there are no changes for a constant time period after a registration time are deleted, and thus the newest information can be maintained. In this way, as the process for maintaining newest information is executed, at the same time, use of the Internet of the terminals arranged in a private network of a client using a specific authorized IP for enabling an user to use the Internet is permitted or blocked.

FIG. 5 is a diagram showing a case allowing use of the Internet via only one line. When use of the Internet is allowed via only one line, a priority to use the Internet is given to the first user who connects to the Internet among the users connecting to a private network using an authorized IP same as an identifier. That is, since an user of SpecialKey1(A) can use the Internet continuously for 20 minutes, even if an user of SpecialKey2(B) or an user of SpecialKey3(C) may try to connect to the Internet, they can not use the Internet since use of the Internet is blocked.

At 30 minutes after connection, if a JOB scheduler is executed, since there are no use records between 20-30 minutes, a record of an user of SpecialKey1(A) using the Internet will be deleted from the Cookie pool DB.

At 31 minutes after connection, if an user of SpecialKey3(c) tries to connect to the Internet, since an user of a private network using the same authorized IP and the same identifier does not exist, an user of SpecialKey3(c) can use the Internet normally after registering an identifier, an authorized IP, an unique Cookie code, and a connection time in the Cookie pool DB.

Until 70 minutes after a connection, even if the users of a private network such as SpecialKey1(A) and SpecialKey2(B) try to connect to the Internet, they will fail.

FIG. 6 is a diagram showing a case allowing use of the Internet via only three lines. FIG. 7 is a diagram showing a Cookie pool DB in case of allowing use of the Internet via only three lines. FIG. 8 is a diagram showing a PMT.

As illustrated in FIG. 6, use of the Internet is allowed via only three lines in PMT, only three users are allowed to connect to a private network using the same authorized IP and the same identifier are allowed, and use of the Internet is blocked for the remaining users. The principle of it is as follows. When an user of SpecialKey1(A) tries to connect to the Internet, if there are no users after confirming whether an user of a private network using the same authorized IP and the same identifier exists in the Cookie pool DB or not, the user can use the Internet normally after registering an identifier, an authorized IP, an unique Cookie code, and a connection time in the Cookie pool DB.

At 10 minutes after connection, when an user of SpecialKey2(B) tries to connect to the Internet, if the unique Cookie code exists in the Cookie pool DB after confirming whether the same authorized IP and the same identifier exists in the Cookie pool DB or not, use of the Internet is allowed. As illustrated in the drawings, if the unique Cookie code does exist in the Cookie pool DB, the number of the unique Cookie code having the same authorized IP and the same identifier in the Cookie pool DB is counted. If the result value(a return value: 1) is below the policy number(the three allowed lines) of PMT, the unique Cookie code of SpecialKey2(B) should be registered, and then use of the Internet is allowed. On the contrary, if the result value is above the policy number(the allowed three lines) of PMT, use of the Internet is blocked.

At 15 minutes after connection, when an user of SpecialKey3(C) tries to connect to the Internet, if the unique Cookie code exists in the Cookie pool DB after confirming whether the same authorized IP and the same identifier exists in the Cookie pool DB or not, use of the Internet is allowed. As illustrated in FIG. 6, if the unique Cookie code does exist in the Cookie pool DB, the number of the unique Cookie code having the same authorized IP and the same identifier in the Cookie pool DB is counted. If the result value(a return value: 2) is below the policy number(the three allowed lines) of PMT, the unique Cookie code of SpecialKey2(B) should be registered, and then use of the Internet is allowed. On the contrary, if the result value is above the policy number(the allowed three lines) of PMT, use of the Internet is blocked.

At 17 minutes after connection, when an user of SpecialKey4(D) tries to connect to the Internet, if the unique Cookie code exists in the Cookie pool DB after confirming whether the same authorized IP and the same identifier exists in the Cookie pool DB or not, use of the Internet is allowed. As illustrated in FIG. 6, if the unique Cookie code does exist in the Cookie pool DB, the number of the unique Cookie code having the same authorized IP and the same identifier in the Cookie pool DB is counted. If the result value(a return value: 3) is below the policy number(the three allowed lines) of PMT, the unique Cookie code of SpecialKey4(D) should be registered, and then use of the Internet is allowed. On the contrary, if the result value is above the policy number(the allowed three lines) of PMT, use of the Internet is blocked.

In this way, permission or blocking of connection to the Internet can be controlled in a private network.

Further, the procedures related to a blocking process can be changed and then applied according to a policy.

INDUSTRIAL APPLICABILITY

In the prior art, the maintenance cost of equipments and a network, and a network speed are limited in an infrastructure built by a conventional Internet communication business man, but since NAT, sharing devices and etc. are used via only one provided line, users who connect to the Internet via only one line or many lines suffer from much damages and inconveniences due to an uncontrolled traffic increase. Therefore, the present invention is devised to solve these problems. Further, the Internet communication business men can improve the services by investing small amount of money for facilities and managing very few maintenance personnel, and thus the common users can receive high-quality services. Further, there is an effect that notice and blocking technology can be provided to each of the terminals using a sharing device.

What is claimed is:

1. A method for permitting and blocking use of Internet by detecting plural terminals on network using more than one authorized IP, the method comprising:

a step for analyzing a TCP/IP packet and redirecting a web connection of a client to a server according to a policy of a specific user in order to confirm the number of plural terminals of a subscriber constituting a private network by redirecting the web connection of the client to the server when monitoring traffic when the client uses the Internet, and to block or permit terminals exceeding a designated number of sharing terminals;

a step for providing to the client a web page having specific functions to perform a selective blocking, and to execute a precision detection algorithm for detecting the number of terminals and notifying to the redirected client;

a step for allocating a unique Cookie code value to the client in a real time manner via the server at the step for providing to the client a web page having specific functions;

a step for registering the unique Cookie code value generated in the client together with an authorized IP of the client or an identifier corresponding to the IP on a Cookie pool DB of the server; and a step for confirming the number of terminals connected to the authorized IP or the identifier corresponding to the IP by counting the number of the unique Cookie code according to the authorized IP stored in the Cookie pool DB.

2. The method for permitting and blocking use of Internet by detecting plural terminals on network as set forth in claim 1, further comprising:

a step for managing a PMT(Policy Management Table) for a policy number of terminals to be permitted and blocked according to clients; and a step for permitting and blocking use of Internet by an algorithm for comparing a related information of the Cookie pool DB and the PMT when all of private network users connect to the Internet at the same time.

3. The method for permitting and blocking use of Internet by detecting plural terminals on network as set forth in claim 1, further comprising:

a step for maintaining or deleting the unique Cookie code value in the Cookie pool DB as a job scheduler after judging whether the Internet is used for a constant period in the Cookie pool DB.

4. The method for permitting and blocking use of Internet by detecting plural terminals on network as set forth in claim 3, further comprising:

a step for storing a history that the unique Cookie code value has been maintained or deleted in a Cookie pool history DB at the step for maintaining or deleting the unique Cookie code value in the Cookie pool DB, and counting the number of the unique Cookie code by using the job scheduler for analyzing the number of detected terminals, and then storing the number of terminals of the authorized IP.

5. The method for permitting and blocking use of Internet by detecting plural terminals on network as set forth in claim 1, comprising:

a step for inserting and executing a precise algorithm of a cookie type, and a permission page and a blocking page according to a policy into an user web browser with respect to the specific user according to the policy.

6. The method for permitting and blocking use of Internet by detecting plural terminals on network as set forth in claim 1, further comprising:

a step for receiving the unique Cookie code in a real time manner, comparing the unique Cookie code with a permission Cookie code stored in the Cookie pool DB, and blocking a related terminal if the unique Cookie code is not the permission Cookie code.

* * * * *